Patented July 11, 1933

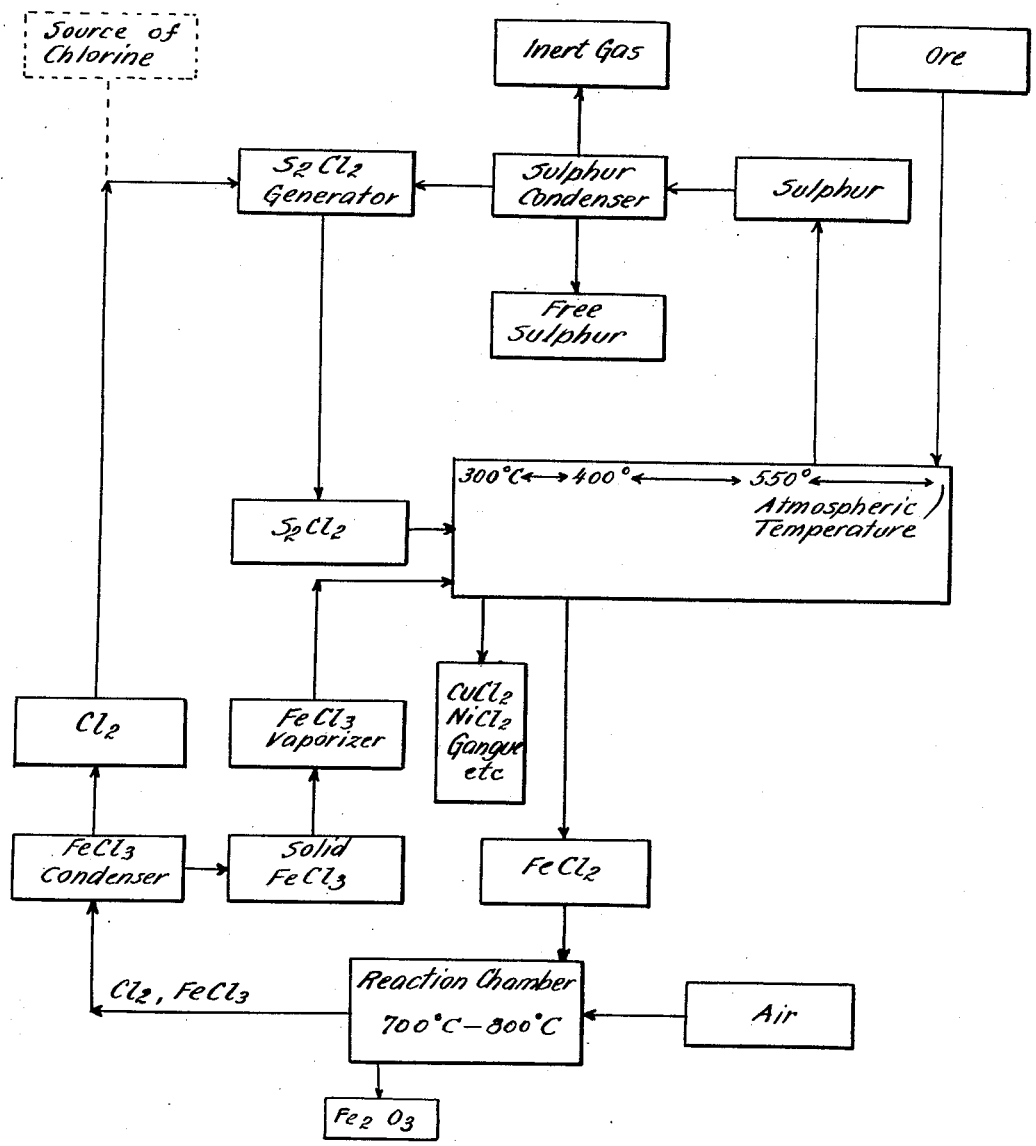

1,917,229

UNITED STATES PATENT OFFICE

RAYMOND F. BACON, OF BRONXVILLE, AND ROCCO FANELLI, OF NEW ROCHELLE, NEW YORK; SAID FANELLI ASSIGNOR TO SAID BACON

TREATMENT OF IRON SULPHIDE-BEARING MATERIAL

Application filed February 26, 1930. Serial No. 431,463.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other or heavy metals, such for example, as copper and nickel, with ferric chloride and sulphur chloride for the purpose of obtaining free sulphur and/or separating iron from the mass of material undergoing treatment.

In carrying out a process in accordance with the present invention, a quantity of the material to be treated is subjected to the action of a mixture of ferric chloride and sulphur chloride under such conditions that free sulphur and ferric chloride are produced and vaporized. The vaporized sulphur is collected and the ferric chloride is utilized for treating additional quantities of sulphide-bearing material to produce a product in which ferrous chloride is concentrated. The ferrous chloride concentrate is appropriately treated to regenerate the ferric chloride and sulphur chloride.

The chlorinating process may be conveniently conducted by passing the sulphide-bearing material progressively through reaction zones of different temperatures. According to the preferred process of the invention, the iron sulphide-bearing material is first introduced into a reaction zone of relatively high temperature and passed progressively through reaction zones of lower temperatures. The process is so controlled that ferrous chloride is produced in the high temperature reaction zones and subsequently converted to ferric chloride in the lower temperature reaction zones. Elemental sulphur is produced and vaporized and the ferric chloride produced is vaporized. The vaporized sulphur and ferric chloride are caused to pass over fresh or partially converted sulphide-bearing material in the higher temperature reaction zones, the sulphur vapor ultimately being collected as free sulphur, and the ferric chloride reacting with sulphide compounds and being reduced to ferrous chloride.

The chlorinating process may be carried out in any suitable type of apparatus, but it is preferably carried out in a rotary reaction chamber in which a suitable temperature gradient is maintained and into which the ferric chloride, sulphur chloride and iron sulphide-bearing material are introduced at appropriate points.

The invention will be better understood from a consideration of the accompanying flowsheet and the following description of a process involving the treatment of ore containing pyrites and sulphides of copper and nickel.

The ore to be treated is introduced in a dry, finely divided condition into the interior of a rotary reaction chamber having charging means at one end and discharging means at the other end. An opening or passage to permit the outward passage of sulphur vapors and other gases is provided near the charging end. The temperature within the reaction chamber is so regulated that it gradually increases from the normal atmospheric temperature at the charging end to a maximum temperature of about 550° C. at a point about midway between the two ends, and gradually decreases from the zone of maximum temperature to about 300° C. at the discharge end. The opening or passage for sulphur vapors is preferably located at a point between the charging end of the chamber and the zone of maximum temperature where the temperature within the chamber is about 450° C. or slightly lower.

The ore preferably ground to provide particles sufficiently small to pass a 100-mesh screen in order that intimate contact of the chlorine with the sulphide compounds may be obtained, is introduced into the reaction chamber at the charging end. Sulphur chloride and ferric chloride are introduced into the reaction chamber at the discharge end.

The process is conducted as a batch process, the discharge end of the chamber being closed. The ore may be fed to the chamber continuously until the desired concentration has been effected, or the ore may be fed to the reaction chamber until a predetermined amount has been introduced.

When ore is first introduced into the reaction chamber, no sulphur chloride or ferric chloride is introduced until the ore reaches or passes the zone of maximum temperature. As the ore reaches the zone of maximum temperature, the sulphur chloride and ferric chloride may be admitted, slowly at first, and in gradually increasing amounts as the ore and chlorinated material progress through the chamber. Sulphur chloride and ferric chloride may be admitted at any desired maximum rate. The rate at which sulphur chloride and ferric chloride are admitted and the amounts admitted will be determined by the rate of feeding of ore into the reaction zones and the amount of ore to be treated.

During the course of the process, the sulphur chloride and ferric chloride first react with the sulphides of iron, copper and nickel to produce free sulphur, ferrous chloride and the chlorides of copper and nickel. The free sulphur is vaporized and passes out of the reaction chamber to suitable collecting and condensing apparatus. As the reaction chamber is rotated, the ferrous chloride-bearing material moves gradually toward the discharge end and fresh ore is moved into the zone of maximum temperature. As the ferrous chloride-bearing material moves toward the discharge end the sulphur chloride reacts with the ferrous chloride and oxidizes it to ferric chloride. The ferric chloride thus produced is vaporized and the resulting vapor is swept along with the entering sulphur chloride and ferric chloride toward the zone of maximum temperature. The ferric chloride comes into contact with fresh or partially chlorinated sulphide-bearing material and is reduced to ferrous chloride.

The process is so conducted and controlled that iron compounds are substantially completely eliminated from the material in the discharge end portion of the reaction chamber and ferrous chloride is concentrated in the adjoining portion of the reaction chamber. The material in the discharge end portion of the reaction chamber will consist substantially entirely of nickel and copper chlorides and gangue materials which may be present in the original ore.

When the ore is fed continuously during the course of a process, the admission of ore and sulphur chloride and ferric chloride may be discontinued when the presence of considerable ferric chloride in the issuing sulphur vapor indicates that insufficient fresh ore is being moved into the reaction zones to react with the ferric chloride present in the reaction chamber, or when the operations have been conducted for a predetermined length of time.

When the ore is fed to the reaction chamber only until a predetermined amount has been admitted, the admission of sulphur chloride and ferric chloride may be discontinued when the last portion of the ore reaches the zone of maximum temperature. The process may be so conducted that satisfactory concentration will have been effected at that time.

In the case of continuous feeding, at the completion of the chlorination treatment, the iron-free material containing chlorides of copper and nickel will be segregated in the discharge end portion of the chamber, fresh or substantially unaltered ore will be present in the portion of the reaction chamber between the charging end and the zone of maximum temperature, and the ferrous chloride-bearing material will be concentrated in the intermediate portion of the reaction chamber.

Upon the completion of a chlorination process involving the admission of a predetermined amount of ore, the iron-free material will be segregated in the discharge end portion of the reaction chamber, and the ferrous chloride-bearing material will be concentrated in the adjoining portion of the chamber. The charging end portion of the chamber will be empty.

When the admission of sulphur chloride and ferric chloride has been discontinued, the discharge end of the reaction chamber may be opened. Rotation of the reaction chamber will cause the contents to be discharged. The iron-free material containing chlorides of copper and nickel is discharged and collected first, and, while the iron-free material is being discharged, the ferrous chloride concentrate is being moved toward the discharge end. After the iron-free material has been discharged and collected, the ferrous chloride concentrate is discharged and collected separately.

When the ferrous chloride concentrate has been discharged, treatment of a fresh batch of ore is commenced.

The ferrous chloride concentrate is subjected to the action of air at a temperature of from about 400° C. to 800° C. in a suitable reaction chamber to recover chlorine and produce ferric chloride. The treatment of the ferrous chloride concentrate is preferably so conducted as to produce an amount of ferric chloride which is sufficient for forming a suitable reagent mixture for introduction into the chlorination chamber. At elevated temperatures ferrous chloride and ferric chloride react with oxygen according to the following equations:

I. $12 FeCl_2 + 3O_2 = 2Fe_2O_3 + 8FeCl_3$
II. $4 FeCl_3 + 3O_2 = 2Fe_2O_3 + 6Cl_2$

During the course of the treatment of the ferrous chloride concentrate with air, the ferrous chloride is first converted to ferric oxide and ferric chloride. A portion of the ferric chloride thus produced is then converted to ferric oxide with the liberation of chlorine. The remainder of the ferric chloride passes out of the reaction chamber in vapor form with the liberated chlorine.

The relative amounts of ferric chloride and chlorine in the gases issuing from the reaction chamber may be controlled by controlling temperature and the rates of introduction of the ferrous chloride concentrate and air into the reaction chamber.

The gases containing chlorine and ferric chloride are cooled to condense the ferric chloride and separate the chlorine. The ferric chloride may be obtained in either the liquid or solid state.

The recovered chlorine together with sufficient fresh chlorine to compensate for losses due to leakage and the production of nickel and copper chlorides is passed through a molten bath of sulphur which has been obtained by condensing a portion of the sulphur produced during the treatment of the ore with sulphur chloride and ferric chloride. Sulphur chloride is thus produced.

The sulphur bath is maintained at a temperature above the boiling point of sulphur chloride and the sulphur chloride distills off as formed. The sulphur chloride vapor is collected and it may be condense to eliminate inert gases. The reaction between sulphur and chlorine will proceed at a temperature below the boiling point of sulphur chloride, but it is advantageous to conduct the reaction at a temperature above the boiling point of sulphur chloride in order to effect the immediate removal of the sulphur chloride from the reaction zone. Condensation of the sulphur chloride will permit the escape of inert gases which enter the system during the admission of air. If desired, the inert gases separated through condensation of the sulphur chloride may be conducted through a tower of solid sulphur in order to scrub out any sulphur chloride vapors contained therein.

The sulphur chloride and ferric chloride produced are utilized for treating the fresh batch of ore.

Inert gases, such as nitrogen, which are introduced into the system during the treatment of the ferrous chloride concentrate with air may also be eliminated when the free sulphur produced is condensed.

A source of fresh chlorine is provided to compensate for losses due to leakage and the formation of nickel and copper chlorides.

The iron-free material may be treated in any suitable manner to recover the nickel and copper.

We claim:

1. The method of treating iron sulphide-bearing material which comprises subjecting the material in a reaction chamber to the action of a chloridizing agent to produce ferrous chloride in the chamber, subjecting said ferrous chloride to the action of additional chloridizing agent in said chamber to convert the ferrous chloride to ferric chloride, vaporizing the ferric chloride, contacting the ferric chloride so produced with said iron sulphide-bearing material to produce a ferrous chloride concentrate, subjecting the ferrous chloride concentrate to the action of air at an elevated temperature to produce chlorine and ferric chloride, and utilizing the chlorine and ferric chloride thus produced to treat additional iron sulphide-bearing material.

2. The method of treating iron sulphide-bearing material which comprises subjecting the material in a reaction chamber to the action of sulphur chloride to produce ferrous chloride and elemental sulphur in one portion of the chamber, subjecting the ferrous chloride to the action of sulphur chloride in another portion of the chamber to convert the ferrous chloride to ferric chloride, vaporizing the ferric chloride, contacting said ferric chloride with the iron sulphide-bearing material in another portion of the chamber to produce a ferrous chloride concentrate, subjecting the ferrous chloride concentrate to the action of air at an elevated temperature to produce chlorine and ferric chloride, combining the chlorine with a portion of the sulphur produced to regenerate sulphur chloride, and utilizing the sulphur chloride and ferric chloride thus produced to treat additional iron sulphide-bearing material.

3. The method of treating iron sulphide-bearing material which comprises subjecting the material in a reaction chamber to the action of sulphur chloride under such conditions that elemental sulphur is formed and vaporized and ferrous chloride is produced, subjecting the ferrous chloride to the action of air to produce chlorine and ferric chloride, separating the chlorine and ferric chloride, combining the chlorine with a portion of the sulphur produced to regenerate sulphur chloride, and utilizing the sulphur chloride and ferric chloride to treat additional iron sulphide-bearing material.

4. The method of treating iron sulphide-bearing material which comprises subjecting the material in a reaction chamber to the action of sulphur chloride and ferric chloride to produce ferrous chloride and elemental sulphur in one portion of the chamber, subjecting the ferrous chloride to the action of sulphur chloride in another portion of the chamber to convert the ferrous chloride to ferric chloride, vaporizing the ferric chloride, contacting said ferric chloride with the iron sulphide-bearing material in another portion of the chamber to produce a ferrous chloride concentrate, subjecting the ferrous chloride to the action of air at an elevated temperature to produce chlorine and ferric chloride, combining the chlorine with a portion of the sulphur produced to regenerate sulphur chloride, and utilizing the sulphur chloride and ferric chloride thus produced to treat additional iron sulphide-bearing material.

5. The method of treating iron sulphide-bearing material which comprises subjecting the material in a reaction chamber to the action of sulphur chloride and ferric chloride to produce elemental sulphur and ferrous chloride, subjecting the ferrous chloride to the action of air at an elevated temperature to recover ferric chloride and produce chlorine, combining the chlorine with a portion of the elemental sulphur produced to regenerate sulphur chloride, and utilizing the recovered ferric chloride and the regenerated sulphur chloride to treat additional iron sulphide-bearing material.

6. The method of treating iron sulphide-bearing material which comprises passing a mixture of chlorinating agents comprising sulphur chloride and ferric chloride in contact with the material and progressively increasing the temperature as less chlorinated portions of the ore come in contact with chlorinating agent.

7. The method of treating iron sulphide-bearing material which comprises passing the material and a mixture of sulphur chloride and ferric chloride in counter-current relationship through zones of different temperatures, said temperatures progressively increasing from the point of first contact of the mixture of sulphur chloride and ferric chloride with the material.

8. The method of treating iron sulphide-bearing material which comprises confining the material in a reaction chamber, maintaining zones of progressively increasing temperatures within the chamber, and introducing a mixture of chlorinating agents comprising sulphur chloride and ferric chloride into a relatively low-temperature zone.

9. The method of treating ore containing sulphides of iron and copper which comprises confining the ore in a reaction chamber, subjecting the ore to the action of a mixture of chlorinating agents including sulphur chloride at an elevated temperature to form and vaporize ferric chloride in said chamber and obtain a substantially iron-free product containing copper chloride, and contacting the ferric chloride so produced with unchlorinated ore to produce a concentrate of ferrous chloride.

10. The method of treating ore containing pyrites and sulphides of copper and nickel which comprises confining the ore in a reaction chamber, subjecting the ore to the action of a mixture of chlorinating agents including sulphur chloride to form and vaporize ferric chloride in said chamber and obtain a substantially iron-free product containing copper and nickel chlorides, and contacting the ferric chloride so produced with unchlorinated ore in said chamber to produce a ferrous chloride concentrate.

In testimony whereof we affix our signatures.

RAYMOND F. BACON.
ROCCO FANELLI.